United States Patent
Wang et al.

(10) Patent No.: US 12,326,513 B2
(45) Date of Patent: Jun. 10, 2025

(54) DYNAMIC SIGNAL TRANSFER CONFIGURATION FOR DRIVERLESS VEHICLE REMOTE MONITORING

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Shuai Wang, Beijing (CN); Zirui Huang, Beijing (CN); Manjiang Zhang, Sunnyvale, CA (US)

(73) Assignees: BAIDU USA LLC, Sunnyvale, CA (US); APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/928,886

(22) PCT Filed: Aug. 19, 2022

(86) PCT No.: PCT/CN2022/113671
§ 371 (c)(1),
(2) Date: Nov. 30, 2022

(87) PCT Pub. No.: WO2024/036618
PCT Pub. Date: Feb. 22, 2024

(65) Prior Publication Data
US 2024/0353521 A1    Oct. 24, 2024

(51) Int. Cl.
*G01S 7/00* (2006.01)
*H04L 67/125* (2022.01)
*B60W 50/00* (2006.01)

(52) U.S. Cl.
CPC ............ *G01S 7/003* (2013.01); *H04L 67/125* (2013.01); *B60W 2050/0005* (2013.01); *B60W 2050/0088* (2013.01); *B60W 2556/30* (2020.02)

(58) Field of Classification Search
CPC .. G01S 7/003; H04L 67/125; B60W 2556/30; B60W 2050/0005; B60W 2050/0088
See application file for complete search history.

(56) References Cited

U.S. PATENT DOCUMENTS

| 10,438,569 | B2 * | 10/2019 | Appu | G09G 5/393 |
| 11,582,431 | B1 * | 2/2023 | Khemka | H04N 23/843 |
| 11,748,283 | B1 * | 9/2023 | Puffer | G06F 13/1668 |
| | | | | 710/267 |

(Continued)

*Primary Examiner* — Jaime Figueroa
*Assistant Examiner* — Zachary Joseph Wallace
(74) *Attorney, Agent, or Firm* — WOMBLE BOND DICKINSON (US) LLP

(57) ABSTRACT

A hardware unit of an ADV comprises an input port to directly receive data from one or more sensors perceiving a driving environment. The hardware unit is coupled with the one or more sensors to perform data processing of the data from one or more sensors. The hardware unit comprises a monitor unit to monitor a data rate of output data after the data processing. The hardware unit further comprises a self-adjustment unit to dynamically configure and adjust the data processing based on the data rate of output data. The hardware unit further comprises an output port to transfer the output data to an autonomous driving system (ADS) of the ADV to control the ADV to drive autonomously based on the output data.

20 Claims, 6 Drawing Sheets

(56) References Cited

U.S. PATENT DOCUMENTS

| | | | | |
|---|---|---|---|---|
| 2018/0010915 | A1* | 1/2018 | Wilhelm | G05D 1/0297 |
| 2018/0293778 | A1* | 10/2018 | Appu | G06T 9/00 |
| 2018/0321052 | A1* | 11/2018 | Gilbert | G08G 1/0141 |
| 2019/0215536 | A1* | 7/2019 | Boisvert | H04N 19/174 |
| 2020/0034617 | A1* | 1/2020 | Croxford | G06V 40/19 |
| 2021/0367904 | A1* | 11/2021 | Park | G06F 9/505 |
| 2022/0046114 | A1* | 2/2022 | Entelis | H04L 12/40 |
| 2022/0120851 | A1* | 4/2022 | Prager | G01S 7/03 |
| 2022/0137855 | A1* | 5/2022 | Irwin | G06F 3/0613 |
| | | | | 711/154 |
| 2022/0141685 | A1* | 5/2022 | Ergen | H04W 28/084 |
| | | | | 370/252 |
| 2022/0281456 | A1* | 9/2022 | Giovanardi | G01S 17/931 |
| 2022/0383728 | A1* | 12/2022 | Brown | G08B 25/08 |
| 2023/0026761 | A1* | 1/2023 | Gianelli | G01S 7/003 |
| 2023/0144333 | A1* | 5/2023 | Yoffe | G01S 13/584 |
| | | | | 342/70 |
| 2023/0236314 | A1* | 7/2023 | Jin | G01S 7/356 |
| | | | | 342/70 |
| 2023/0269566 | A1* | 8/2023 | Spagnolini | G01S 7/003 |
| | | | | 455/39 |

* cited by examiner

DYNAMIC SIGNAL TRANSFER CONFIGURATION FOR DRIVERLESS VEHICLE REMOTE MONITORING

CROSS-REFERENCE TO RELATED APPLICATIONS

This application is a National Stage of International Application No. PCT/CN2022/113671, filed Aug. 19, 2022, which is hereby incorporated by reference in its entirety.

TECHNICAL FIELD

Embodiments of the present disclosure relate generally to autonomous driving vehicles. More particularly, embodiments of the disclosure relate to operating an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Remote monitoring is important to improve operation safety of the ADVs, however, remote monitoring is difficult due to limited communication bandwidth and limited on board computation resources.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
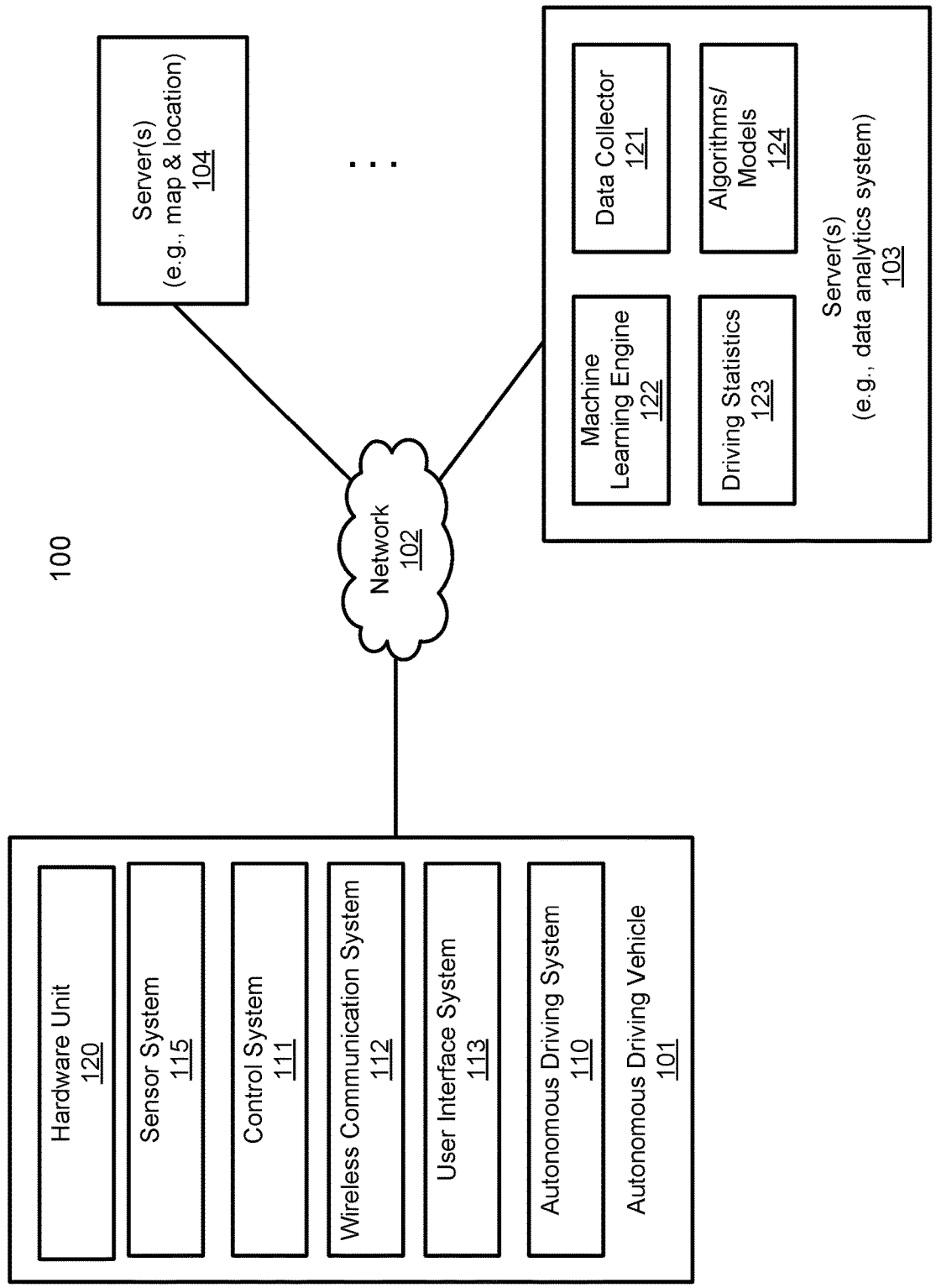
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In order to improve operation safety of the ADVs, remote monitoring is important. However, it is challenging for remote monitoring due to limited communication bandwidth and limited on board computation resources. Currently, data from the sensors, e.g., camera, LiDAR or Radar, are processed by a central processing unit (CPU) or graphics processing unit (GPU) of a processor before transferring the data. Thus, processing the data consumes the CPU or GPU resources. In addition, processing the data by the CPU or GPU is not flexible in various driving conditions. Remote monitoring is difficult due to limited communication bandwidth and limited CPU or GPU resources. Remote operation is not secure if on-the vehicle gateway is broken.

The present disclosure addresses the above-noted and other deficiencies by adding a hardware unit to the ADV to process the data from the various sensors. For example, the hardware unit has direct access of the data from the various sensors, e.g. camera, radar, LiDAR. The hardware unit may have a time processing unit which may provide accurate time before data processing. The hardware unit may have a monitor unit which may check output data rate. The hardware unit can self-adjust to meet different situations. Self-adjustment scheme is used to dynamically configure and adjust data processing. The hardware unit enables remote configuration. The hardware unit may further have a software interface which may be enabled for use to remote operate the configuration. The hardware unit may have a security access control unit which is added to authenticate user access on top of standard security gateway. In this way, the hardware unit processes the data from the various sensors. The limited CPU or GPU resources are saved for motion planning and control operations. The remote operation is enabled to improve operation safety. Therefore, the performance of the ADV is improved.

According to some embodiments, a hardware unit of an ADV is disclosed herein. The hardware unit comprises an input port to directly receive data from one or more sensors perceiving a driving environment. The hardware unit is coupled with the one or more sensors to perform data processing of the data from one or more sensors. The hardware unit comprises a monitor unit to monitor a data rate of output data after the data processing. The hardware unit further comprises a self-adjustment unit to dynamically configure and adjust the data processing based on the data rate of output data. The hardware unit further comprises an output port to transfer the output data to an autonomous driving system (ADS) of the ADV to control the ADV to drive autonomously based on the output data.

According to some embodiments, an ADV is disclosed herein. The ADV comprises one or more sensors to perceive a driving environment. The ADV comprises a hardware unit which comprises an input port to directly receive data from one or more sensors perceiving a driving environment. The hardware unit is coupled with the one or more sensors to perform data processing of the data from one or more sensors. The hardware unit comprises a monitor unit to monitor a data rate of output data after the data processing. The hardware unit further comprises a self-adjustment unit to dynamically configure and adjust the data processing based on the data rate of output data. The hardware unit further comprises an output port to transfer the output data. The ADV further comprises an ADS to receive the output data from the output port and control the ADV to drive autonomously based on the output data.

According to some embodiments, a method for operating an ADV is disclosed herein. The method comprises directly receiving, by a hardware unit, data from one or more sensors perceiving a driving environment. The method further comprises performing, by the hardware unit, data processing of the data from one or more sensors. The method further comprises monitoring, by the hardware unit, a data rate of output data after the data processing. The method further comprises dynamically configuring and adjusting, by the hardware unit, the data processing based on the data rate of output data. The method further comprises controlling, by an autonomous driving system (ADS), the ADV to drive autonomously based on the output data.

In one embodiment, the one or more sensors include a camera, a radar or a LiDAR. In one embodiment, the hardware unit further comprises a time processing unit to provide time for the data before data processing.

In one embodiment, the hardware unit is further coupled with an external communication interface. In one embodiment, the monitor unit is further to monitor a communication bandwidth, and wherein the self-adjustment unit is further to dynamically configure and adjust the data processing based on the communication bandwidth.

In one embodiment, the hardware unit further comprises a software interface to enable remotely configuring the data processing. In one embodiment, the hardware unit further comprises a security access control unit to authenticate a user access to the software interface to remotely configure the data processing.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 includes a hardware unit 120 to perform data processing of the data from one or more sensors in the sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 and 120 may be communicatively coupled to each other via an interconnect, a bus, a network, or a combination thereof. For example, components 110-115 and 120 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
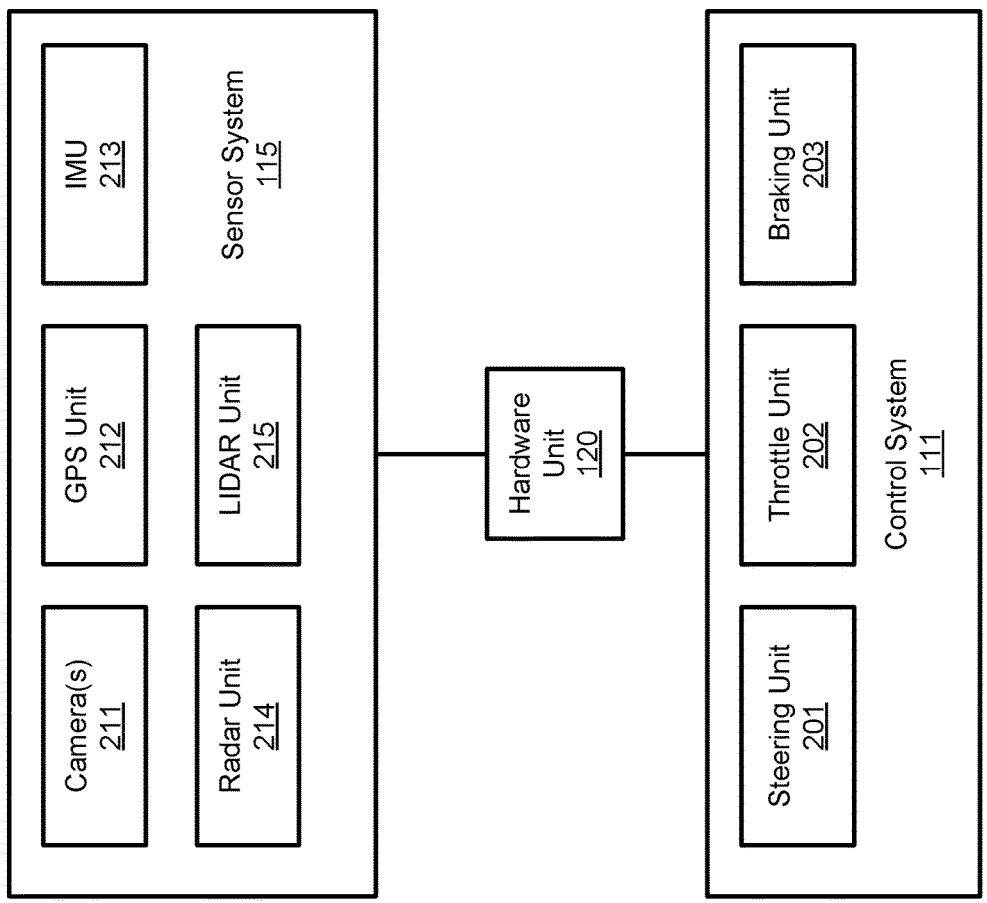
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

The hardware unit 120 is to process the data from the various sensors in the sensor system 115. For example, the hardware unit 120 has direct access of the data from the various sensors, e.g. camera, radar, LiDAR. The hardware unit 120 may have a time processing unit which may provide accurate time before data processing. The hardware unit 120 may have a monitor unit which may check output data rate. The hardware unit 120 can self-adjust to meet different situations. Self-adjustment scheme is used to dynamically configure and adjust data processing. The hardware unit 120 enables remote configuration. The hardware unit 120 may further have a software interface which may be enabled for use to remote operate the configuration. The hardware unit 120 may have a security access control unit which is added to authenticate user access on top of standard security gateway.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
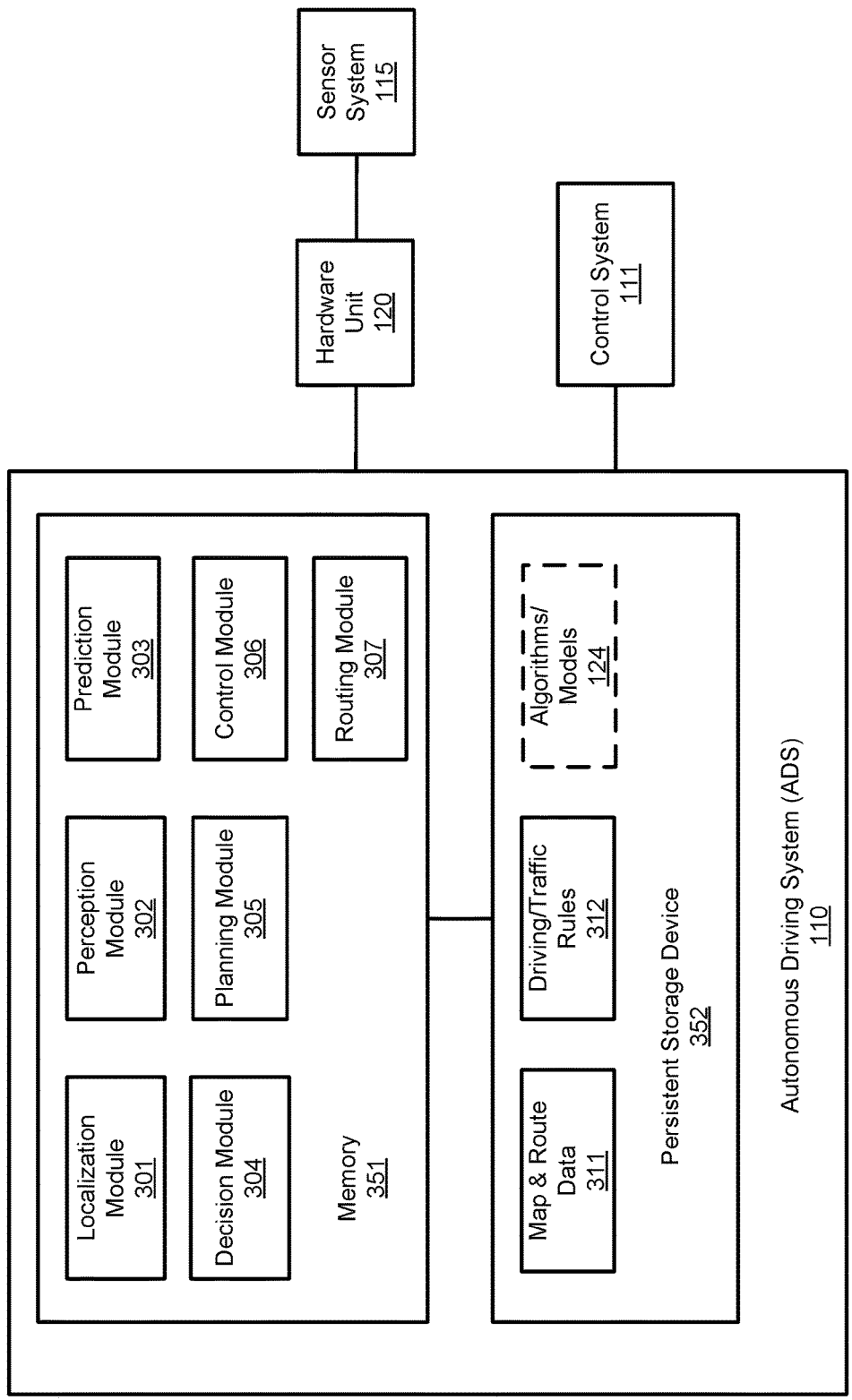
FIGS. 3A-3B are block diagrams illustrating an example of an autonomous driving system used with an autonomous driving vehicle according to one embodiment.
Figure 3B:
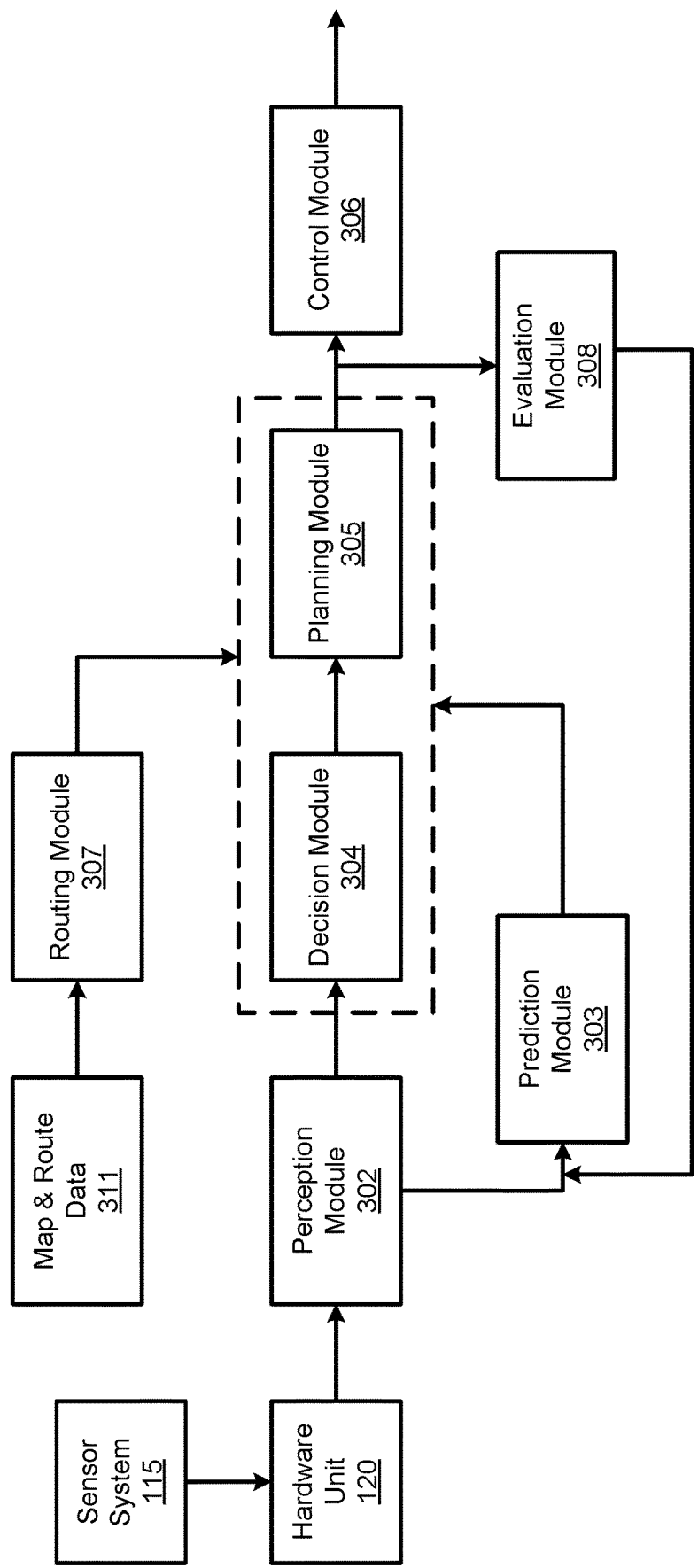

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, sensor system 115 and hardware unit 120. In one embodiment, hardware unit 120 is integrated with the ADS 110. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

The hardware unit 120 is to directly access of the data from the various sensors in the sensor system 115 and process the data from the various sensors. For example, the hardware unit 120 may have a time processing unit which may provide accurate time before data processing. The hardware unit 120 may have a monitor unit which may check output data rate. The hardware unit 120 can self-adjust to meet different situations. Self-adjustment scheme is used to dynamically configure and adjust data processing. The hardware unit 120 further enables remote configuration. The hardware unit 120 may further have a software interface which may be enabled for use to remote operate the configuration. The hardware unit 120 may have a security access control unit which is added to authenticate user access on top of standard security gateway. After data processing, the hardware unit 120 sends the output data to the ADS, e.g., perception module 302.

Based on the processed sensor data, e.g., output data from the hardware unit 120, and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. For example, prediction module 303 predicts a trajectory of the object. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a trajectory or a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a trajectory or a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
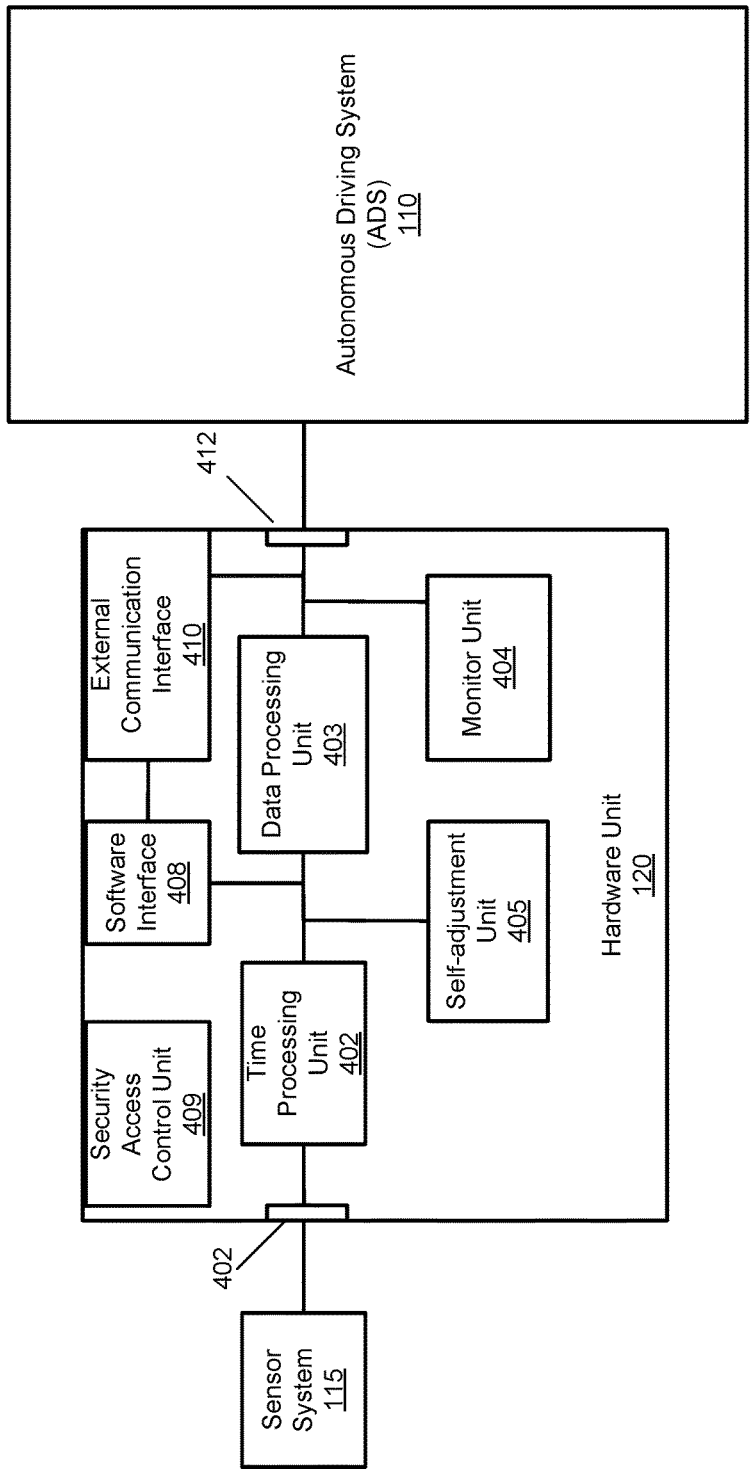
FIG. 4 is block diagram illustrating an example of a hardware unit of an autonomous driving vehicle according to one embodiment.

FIG. 4 is block diagram illustrating an example of the hardware unit 120 of the ADV 101 according to one embodiment. Referring to FIG. 4, the hardware unit 120 is coupled to the sensor system 115 and the ADS 110. In one embodiment, the hardware unit 120 is between the sensor system 115 and the ADS 110. In another embodiment, the hardware unit 120 may be integrated with the ADS 110. The hardware unit 120 may be configured to process the data from the sensors in the sensor system 115. The hardware unit 120 include a field-programmable gate array (FPGA), an application-specific integrated circuit (ASIC), a system-on-a-chip (SoC), or other electronic components, electronic devices, or logic devices. The hardware unit 120 may be configured to perform video processing, LiDAR processing, and/or radar processing. For example, the hardware unit 120 may be configured to process the data from the sensors by digital circuits, digital signal processing (DSP), or vector processing.

The hardware unit 120 has direct access of data from the sensors in the sensor system 115, e.g. camera, radar, LiDAR. In one embodiment, the hardware unit 120 may have an input port to directly receive data from the sensors perceiving a driving environment. In one embodiment, the hardware unit 120 may have multiple input ports to directly receive data from the multiple sensors perceiving the driving environment.

In one embodiment, the hardware unit 120 may include an external communication interface 410 for communicating, for example, via a wireless network. For example, the wireless network may be any type of networks such as a local area network (LAN), a wide area network (WAN) such as the Internet, a cellular network, a satellite network, or a combination thereof, wired or wireless. For example, the external communication interface 410 may be used for communicating via a cellular network (e.g., LTE, 5G, etc.). In one embodiment, the hardware unit 120 may communicate with a remote operator through the external communication interface 410 for remote monitoring.

As illustrated in FIG. 4, the hardware unit 120 may have a time processing unit 402 which may provide accurate time before data processing. The time processing unit 402 may include electric circuits to provide accurate time to synchronize the data processing process.

In one embodiment, the hardware unit 120 may have a data processing unit 403. The data processing unit 403 is configured to process the data from the various sensors. The data processing unit 403 may be configured to perform video processing, LiDAR processing, and/or radar processing. For example, the data processing unit 403 may be configured to process the data from the sensors by digital circuits, transistor level processing, digital signal processing (DSP), or vector processing. After data processing, the data processing unit 403 may send output data to the ADS 110, by an output port 412, as illustrated in FIG. 4. In one embodiment, the hardware unit 120 may communicate with the ADS 110 via wireless communication (e.g., LTE, 5G, etc.). In one embodiment, the hardware unit 120 may communicate with the ADS 110 via wired communication within the ADV.

The hardware unit 120 may have a monitor unit 404 which may check a data rate of the output data. In one embodiment, the monitor unit 404 is further to monitor a communication bandwidth, for example, a bandwidth of a 5G wireless communication.

The hardware unit 120 may include a self-adjustment unit 405 to dynamically configure and adjust the data processing. The hardware unit 120 can self-adjust to meet different situations. In one embodiment, the self-adjustment unit 405 is configured to dynamically configure and adjust the data processing based on the data rate of the output data. In one embodiment, the self-adjustment unit 405 is configured to dynamically configure and adjust the data processing based on a communication bandwidth. For example, the communication bandwidth includes a communication bandwidth of a communication with the remote operator. In one embodiment, the self-adjustment unit 405 is configured to dynamically configure and adjust the data processing based on the data rate of the output data and the communication bandwidth. As an example, for the data processing from the camera, when the data rate of the output data is low, e.g., the self-adjustment unit 405 may compress the output data to relieve the load, thereby improving the data processing. In one embodiment, the self-adjustment unit 405 may dynamically adjust a compression ratio of the data based on at least one of the data rate of the output data or the communication bandwidth. As another example, when the 5G communication bandwidth is limited, the self-adjustment unit 405 may adjust the configuration of the data processing for a LiDAR, e.g., selecting region of interest (ROI) from a point cloud of data from the LiDAR. In one embodiment, the self-adjustment unit 405 may dynamically select the ROI from the point cloud of data from the LiDAR based on at least one of the data rate of the output data or the communication bandwidth.

The hardware unit 120 further enables remote configuration. The hardware unit 120 may further have a software interface 408 which may be enabled for use to remote operate the configuration of the data processing. Remote monitoring is important to improve the operation safety of ADV. The software interface 408 may be configured to enable the operator to remotely monitoring and controlling the configuration of the data processing, e.g., through 5G communication.

Figure 5:
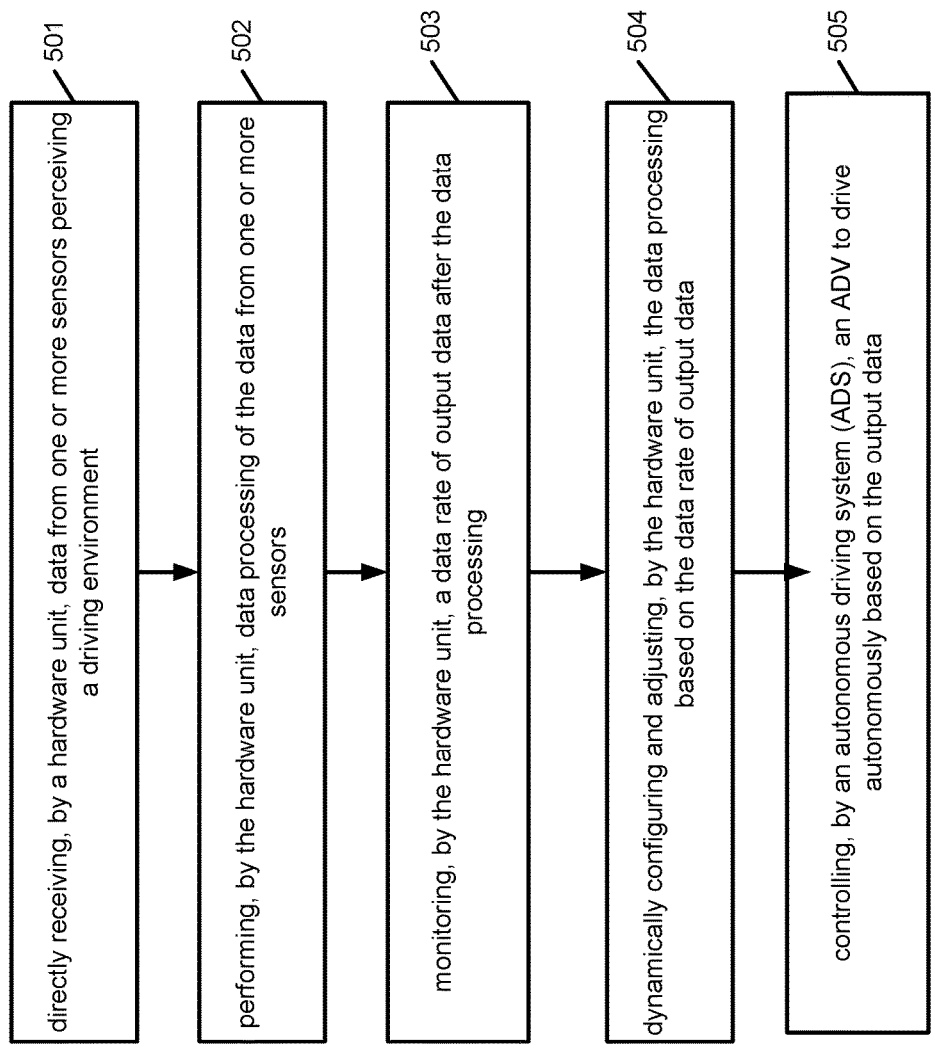
FIG. 5 is a flow diagram illustrating a method of operating an autonomous driving vehicle using a hardware unit according to one embodiment.

To further improve security, the hardware unit 120 may have a security access control unit 409 which is added to authenticate a user access in addition to a standard security gateway. In the case that standard security gateway is broken, the security access control unit 409 is able to authenticate the user access and provide the increased security of operating the ADV FIG. 5 is a flow diagram illustrating a method of operating an autonomous driving vehicle using a hardware unit according to one embodiment. Method 500 may be performed by processing logic which may include software, hardware, or a combination thereof. Referring to FIG. 5, in operation 501, processing logic directly receives, by a hardware unit, data from one or more sensors perceiving a driving environment In operation 502, processing logic performs, by the hardware unit, data processing of the data from one or more sensors In operation 503, processing logic monitors, by the hardware unit, a data rate of output data after the data processing In operation 504, processing logic dynamically configures and adjusts, by the hardware unit, the data processing based on the data rate of output data.

In operation 504, processing logic controls, by an autonomous driving system (ADS), the ADV to drive autonomously based on the output data.

By this method, the hardware unit processes the data from the various sensors, instead of using on-board COPU or CPU to processes the data from the various sensors. Thus, the limited on-board CPU or GPU resources are saved for motion planning and control operations. The remote operation is enabled by the software interface to improve operation safety. Therefore, the motion planning and control operations of the ADV is improved, as well as the safety and the security of operating the ADV. Advantageously, the hardware unit improves the performance of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A hardware unit of an autonomous driving vehicle (ADV), comprising:
   an input port to directly receive data from one or more sensors perceiving a driving environment, wherein the hardware unit is coupled with the one or more sensors to perform data processing of the data from one or more sensors;
   a monitor unit to monitor a data rate of output data after the data processing;
   a self-adjustment unit to dynamically configure and adjust the data processing of the data from one or more sensors based on the data rate of output data; and
   an output port to transfer the output data to an autonomous driving system (ADS) of the ADV to control the ADV to drive autonomously based on the output data.

2. The hardware unit of claim 1, wherein the one or more sensors include a camera, a radar or a LiDAR.

3. The hardware unit of claim 1, further comprising a time processing unit to provide time for the data before data processing.

4. The hardware unit of claim 1, wherein the hardware unit is further coupled with an external communication interface.

5. The hardware unit of claim 1, wherein the monitor unit is further to monitor a communication bandwidth, and wherein the self-adjustment unit is further to dynamically configure and adjust the data processing based on the communication bandwidth.

6. The hardware unit of claim 1, further comprising a software interface to enable remotely configuring the data processing.

7. The hardware unit of claim 6, further comprising a security access control unit to authenticate a user access to the soft interface to remotely configure the data processing.

8. An autonomous driving vehicle (ADV), comprising:
   one or more sensors to perceive a driving environment;
   a hardware unit comprising:
      an input port to directly receive data from the one or more sensors, wherein the hardware unit is coupled with the one or more sensors to perform data processing of the data from one or more sensors;

a monitor unit to monitor a data rate of output data after the data processing;

a self-adjustment unit to dynamically configure and adjust the data processing of the data from one or more sensors based on the data rate of output data; and an output port to transfer the output data; and an autonomous driving system (ADS) to receive the output data from the output port and control the ADV to drive autonomously based on the output data.

9. The ADV of claim 8, wherein the one or more sensors include a camera, a radar or a LiDAR.

10. The ADV of claim 8, wherein the hardware unit further comprises a time processing unit to provide time for the data before data processing.

11. The ADV of claim 8, wherein the hardware unit is further coupled with an external communication interface.

12. The ADV of claim 8, wherein the monitor unit is further to monitor a communication bandwidth, and wherein the self-adjustment unit is further to dynamically configure and adjust the data processing based on the communication bandwidth.

13. The ADV of claim 8, wherein the hardware unit further comprises a software interface to enable remotely configuring the data processing.

14. The ADV of claim 13, wherein the hardware unit further comprises a security access control unit to authenticate a user access to the software interface to remotely configure the data processing.

15. A method for operating an autonomous driving vehicle (ADV), the method comprising:
   directly receiving, by a hardware unit, data from one or more sensors perceiving a driving environment;
   performing, by the hardware unit, data processing of the data from one or more sensors;
   monitoring, by the hardware unit, a data rate of output data after the data processing;
   dynamically configuring and adjusting, by the hardware unit, the data processing of the data from one or more sensors based on the data rate of output data; and
   controlling, by an autonomous driving system (ADS), the ADV to drive autonomously based on the output data.

16. The method of claim 15, further comprising
   providing, by the hardware unit, time for the data before data processing.

17. The method of claim 15, wherein the one or more sensors include a camera, a radar or a LiDAR.

18. The method of claim 15, further comprising monitoring, by the hardware unit, a communication bandwidth, wherein the dynamically configuring and adjusting, by the hardware unit, the data processing is further based on the communication bandwidth.

19. The method of claim 15, further comprising
   enabling, by the hardware unit, remotely configuring the data processing.

20. The method of claim 19, further comprising
   authenticating, by the hardware unit, a user access to a software interface to remotely configure the data processing.

* * * * *